UNITED STATES PATENT OFFICE.

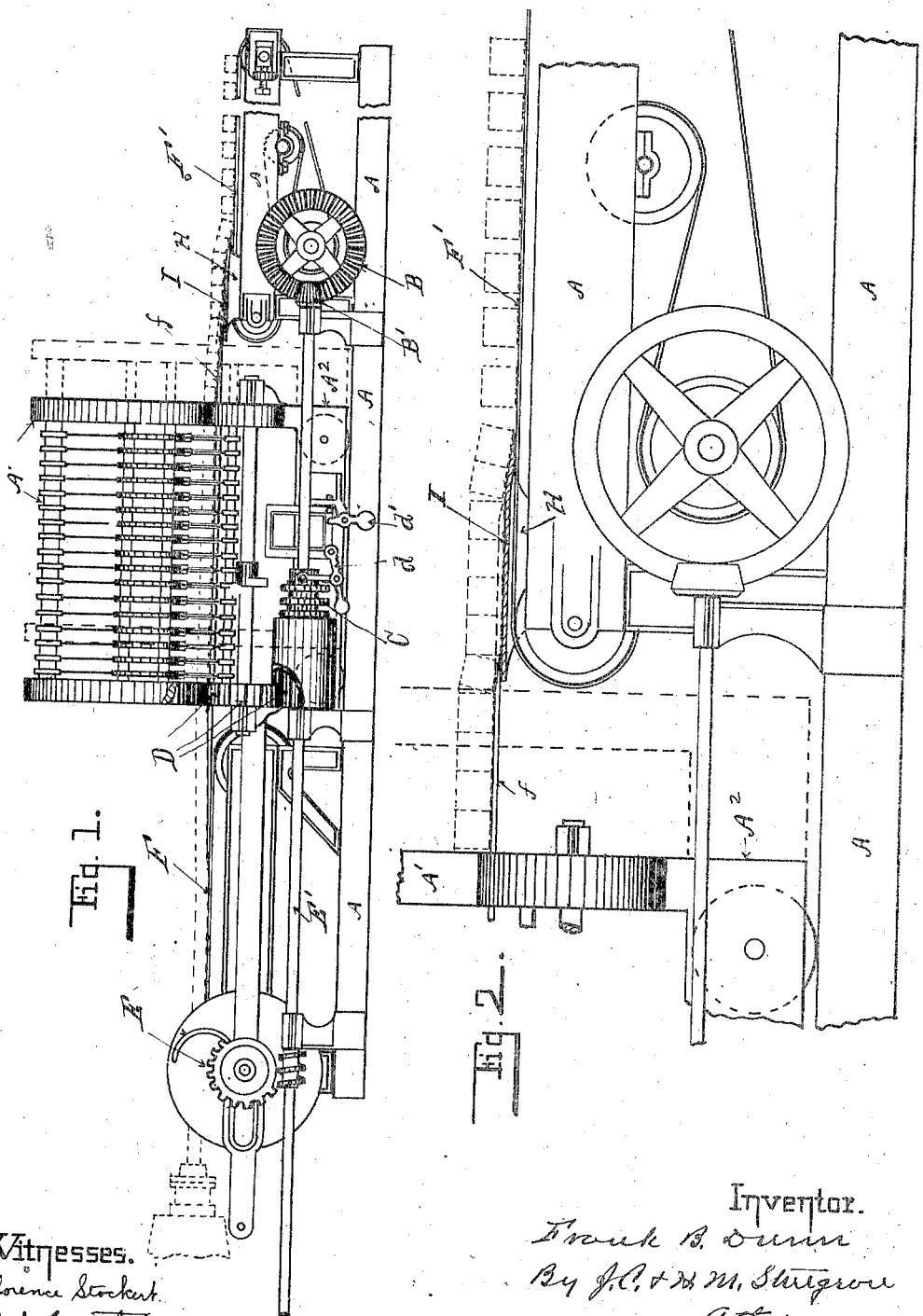

FRANK B. DUNN, OF CONNEAUT, OHIO.

BRICK-CUTTING MACHINE.

967,350.
Specification of Letters Patent.
Patented Aug. 16, 1910.

Application filed January 3, 1910. Serial No. 536,185.

*To all whom it may concern:*

Be it known that I, FRANK B. DUNN, a citizen of the United States, residing at Conneaut, in the county of Ashtabula and State of Ohio, have invented certain new and useful Improvements in Brick-Cutting Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to mechanism for wire-cutting brick, and particularly to means for distributing the brick upon the delivery belt of the machine, after being cut.

In brick cutting machines, as now made, the column of clay continuously travels from the forming die through cutting mechanism where intermittently a section thereof is cut into bricks; the cutter mechanism moving in unison with the column of clay during such cutting operation, and the brick so cut are forced onward by the moving column of clay, and delivered upon the delivery plate secured to the cutting device, and therefrom to the delivery belt of the machine, which delivery belt travels at a speed considerably greater than that of the clay column, so that as the bricks are delivered thereto they are spaced thereon some distance apart from each other. Meanwhile, after each cut is made the cutting mechanism automatically moves back to be in position to make another cut, and during this backward movement the delivery plate on the cutting mechanism bridges the space between the end of the cutter and the delivery belt. It is manifest therefore that during the backward movement of the cutter mechanism the cut brick will pass off of the end of the delivery plate upon the delivery belt much more rapidly than at any other time, and that during the forward movement of the cutter mechanism no bricks will be delivered upon the belt. This condition of affairs causes the cut brick to be disposed upon the delivery belt in groups, instead of at regular intervals, thus causing considerable inconvenience in their subsequent manipulation. To overcome this I have inserted a stationary delivery plate directly over the rear portion of the delivery belt, over which plate the delivery plate secured to the cutter mechanism reciprocates, and from which plate the cut brick are continuously moved to the delivery belt as the column of clay forces them forward at a constant speed regardless of the reciprocation of the cutter mechanism.

The features of my invention are hereinafter fully set forth and explained and illustrated in the accompanying drawings in which:

Figure 1 is a side view in elevation of a brick cutting machine embodying my invention. Fig. 2 is an enlarged side view of a section of the same, with my attachment in section.

In these drawings the frame A, cutting reel A', its supporting carriage A², the cutter driving gear B B' D, the clutch mechanism C, the clutch tripping mechanism d d'; the carriage operating mechanism E E', the clay column carrier belt mechanism F, the delivery plate f, and the brick delivery belt F' are all of the usual and ordinary construction, and in which I do not claim any invention.

To the frame A near the inner end of the delivery belt F' I secure brackets H to which a plate I is secured, so as to be directly over and adjacent to the rear portion of the delivery belt F', and so located with relation to the delivery plate f that said delivery plate will slide freely over it, and when the cutter mechanism is farthest back the outer end of the delivery plate f slightly overlaps the rear end of the stationary receiving plate I. It will readily be seen that the plate I operates to retain the bricks in their normal traveling positions regardless of the forward and backward movement of the cutter mechanism A', so that they will be pushed upon the delivery belt at regular intervals.

I have shown and described my device as combined with a rotary cutter type of machine. It is obvious however that it is equally applicable to any machine in which the cutter mechanism travels in unison with the clay column during the cutting operation.

Having described my invention so as to enable others to construct and utilize the same, what I claim as new and desire to secure by Letters-Patent is:

1. The combination in a brick cutting machine of a reciprocating delivery plate thereon, and a receiving plate over the rear portion of the delivery belt over which the reciprocating delivery plate on the cutter mechanism operates, substantially as set forth.

2. The combination in a brick cutting machine, of a cutter mechanism traveling in unison with a clay column during the cutting operation, a delivery belt, a delivery plate secured to and traveling with said cutting mechanism and operating over the rear end of the delivery belt, and a receiving plate between said traveling delivery plate and the rear part of the delivery belt, substantially as set forth.

In testimony whereof I affix my signature, in presence of two witnesses.

FRANK B. DUNN.

Witnesses:
HERBERT H. SMITH,
H. M. STURGEON.